(12) United States Patent
Kim et al.

(10) Patent No.: US 7,708,309 B2
(45) Date of Patent: May 4, 2010

(54) DRIVER'S AIRBAG MODULE ASSEMBLY STRUCTURE

(75) Inventors: Tae-hoon Kim, Wonju-si (KR); Se-hwa Jeong, Wonju-si (KR)

(73) Assignee: Delphi Korea Corporation, Troy, MI (US)

( * ) Notice: Subject to any disclaimer, the term of this patent is extended or adjusted under 35 U.S.C. 154(b) by 672 days.

(21) Appl. No.: 11/551,012

(22) Filed: Oct. 19, 2006

(65) Prior Publication Data

US 2007/0132218 A1 Jun. 14, 2007

(30) Foreign Application Priority Data

| Oct. 20, 2005 | (KR) | .................... 10-2005-0099362 |
| Jan. 24, 2006 | (KR) | .................... 10-2006-0007456 |
| Jul. 21, 2006 | (KR) | .................... 10-2006-0068570 |

(51) Int. Cl.
    *B60R 21/203* (2006.01)
(52) U.S. Cl. ................................................ 280/731
(58) Field of Classification Search ............. 280/728.2, 280/731; 200/61.54, 61.55
    See application file for complete search history.

(56) References Cited

U.S. PATENT DOCUMENTS

| 4,934,735 | A | * | 6/1990 | Embach ..................... 280/731 |
| 5,419,585 | A | * | 5/1995 | Breed et al. ................ 280/731 |
| 5,470,099 | A | * | 11/1995 | Williams ................. 280/728.2 |
| 5,704,635 | A | * | 1/1998 | Tajiri et al. .............. 280/728.2 |
| 5,765,860 | A | * | 6/1998 | Osborn et al. ............ 280/728.2 |
| 5,904,366 | A | * | 5/1999 | Nishijima et al. ......... 280/728.2 |
| 6,419,261 | B1 | * | 7/2002 | Ibe ........................... 280/728.2 |
| 7,059,631 | B2 | * | 6/2006 | Schorle et al. ............. 280/731 |
| 2004/0041370 | A1 | * | 3/2004 | Hier et al. .................. 280/728.2 |
| 2005/0230938 | A1 | * | 10/2005 | Thomas et al. ........... 280/728.2 |
| 2006/0066082 | A1 | * | 3/2006 | Tsujimoto et al. .......... 280/731 |
| 2007/0278772 | A1 | * | 12/2007 | Burghardt et al. ........... 280/731 |

* cited by examiner

*Primary Examiner*—Paul N Dickson
*Assistant Examiner*—Robert A Coker
(74) *Attorney, Agent, or Firm*—Thomas N. Twomey

(57) ABSTRACT

Provided is a driver's airbag module assembly structure including: an inflator for generating gas by igniting an exploder; an airbag inflated toward a driver by the gas generated by the inflator; a cage covering the inflator; a mounting plate for accommodating the inflator, the airbag, and the cage to be fixed in a cover member disposed at a handle; and a horn plate installed between the mounting plate and a steering wheel, characterized in that the mounting plate has a plurality of fixing clips formed at its outer surface, the cover member has a plurality of coupling holes coupled with the fixing clips, the horn plate is provided with a bracket having an angled tip and a fastening hole, and the steering wheel is provided with a groove having an angled step corresponding to the bracket of the horn plate.

Therefore, hooks of a mounting plate push flexible pieces formed at coupling holes of a cover to allow the mounting plate and the cover to be easily coupled with each other. In addition, since the hooks are closely inserted into lower horizontal holes, movement of the hooks can be reduced. Further, the hooks do not separate from the coupling holes when the airbag is deployed.

11 Claims, 16 Drawing Sheets

DRIVER'S AIRBAG MODULE ASSEMBLY STRUCTURE

CROSS-REFERENCE TO RELATED APPLICATIONS

Republic of Korea Application No. 10-2005-0099362, filed Oct. 20, 2005; Republic of Korea Application No. 10-2006-0007456, filed Jan. 24, 2006; and Republic of Korea Application No. 10-2006-0068570, filed Jul. 21, 2006.

BACKGROUND OF THE INVENTION

1. Field of the Invention

The present invention relates to a driver's airbag module assembly structure, and more particularly, to a driver's airbag module assembly structure enabling easy assembly of an airbag module installed in a steering wheel.

2. Description of the Prior Art

Generally, an airbag system for an automobile is a safety device for reducing injury due to impact in a collision by instantly inflating an airbag installed in a steering wheel or a glove box between a driver and the steering wheel or between a passenger and the glove box. The airbag system works independently from a seat belt.

The airbag system for driver/passenger has an inflator for generating gas by igniting an exploder. The gas generated by the inflator expands to deploy the airbag toward the driver sitting in the driver's seat.

In addition, the airbag system includes a mounting plate fixed to a cover member provided on the steering wheel by a bolt, etc., an airbag module having a horn plate, and so on, installed on the mounting plate, an impact sensor for detecting an impact signal upon collision, and an electronic control module for igniting the exploder of the inflator in response to the impact signal.

The airbag of the driver's airbag module is covered with the cover member separated from the steering wheel when the airbag is expanded. The inflator of the driver's airbag module contains a gas generating agent for expanding gas generated by igniting the exploder and supplying the expanding gas into the airbag.

However, in the conventional art, since the mounting plate and the cover member are assembled by fastening the bolt, the assembly process is complicated and the number of parts is increased, thereby increasing manufacturing cost and weight.

FIG. 1A is an exploded perspective view of an airbag module assembly structure.

As shown in FIG. 1A, the airbag module includes a cover member 30a supported by ribs 22a formed at a rear surface of an airbag module cover 20a, a mounting plate 40a engaged with the cover member 30a, fastening parts 50a formed on the mounting plate 40a, and fastening support parts 60a formed on the cover member 30a.

Each of the fastening parts 50a includes a fastening hole 52a formed at the cover member 30a, and a fastening piece 54a projecting from a side surface of the mounting plate 40a to pass through the fastening hole 52a, and bent at its tip away from the fastening hole 52a.

In addition, each of the fastening support parts 60a includes a coupling hole 62a formed at the cover member 30a, and a fastening support piece 64a projecting from the side surface of the mounting plate 40a to be hooked by the fastening hole 62a. The fastening support part 60a is formed adjacent to the fastening part 50a.

Further, the coupling hole 62a has a fastening aperture (not shown) through which the fastening support piece 64a passes, and a support threshold (not shown) formed at a predetermined space vertically punched from the fastening aperture. Here, the coupling hole 62a further includes a support aperture formed under the support threshold and in communication with the fastening aperture.

FIG. 1B is an exploded perspective view of another airbag module assembly structure different from that of FIG. 1A.

As shown in FIG. 1B, the airbag module assembly structure includes a mounting plate 20b having coupling projections 22b, and a cover member 30b having coupling holes 32b, the coupling projections 22b and the coupling holes 32b being engaged with each other.

Each of the coupling projections 22b includes a fastening piece (not shown) projecting from a side surface of the mounting plate 20b with a uniform thickness and bent at its tip away from the engagement, and a support piece (not shown) having a width smaller than the fastening piece and extending from an upper surface of the fastening piece to an outer surface of the mounting plate.

In addition, each of the coupling holes 32b includes a fastening aperture (not shown) through which the tip of the fastening piece passes to be inserted, a guide aperture (not shown) vertically punched from the fastening aperture to a predetermined distance to guide vertical movement of the support piece, and a support threshold (not shown) naturally formed by forming the fastening aperture and the guide aperture.

The coupling hole 32b further includes a support aperture horizontally elongated from a position vertically adjacent to the fastening aperture and through which the guide aperture passes.

FIG. 1C is an exploded perspective view of yet another airbag module assembly structure different from those of FIGS. 1A and 1B.

As shown in FIG. 1C, the airbag module assembly structure includes a mounting plate 40c, a cover member 30c formed at a rear surface of an airbag module cover 20c, and coupling projections 42c and coupling holes 32c coupled with each other.

Each of the coupling projections 42c includes a body projecting from an outer surface of the mounting plate 40c and having an upper width larger than a lower width, and a tip bent away from a coupling direction of the body.

In addition, the coupling hole 32c includes a fastening aperture formed at the cover member 30c and through which an upper part of the body passes.

However, since all of the conventional art described above requires strong external force for coupling the cover member and the mounting plate, assembly is a time consuming operation, therefore lowering productivity.

Further, FIG. 1D illustrates a conventional driver's airbag module assembly structure.

As shown in FIG. 1D, the conventional driver's airbag module assembly structure includes an insert 2 formed of a flat plate, and a base plate 25 detachably installed at the insert 2. The insert 2 has bushings 28 projecting upward from the insert 2, and locking springs 29 resiliently installed at the bushings 28.

In addition, the base plate 25 has snap pins 26 projecting from a lower surface thereof corresponding to the bushings 28 and fixing an inflator 21 at a center thereof. The snap pins 26 have fastening grooves 26a allowing detachable installation into the locking springs 29.

In the conventional airbag module assembly structure, the snap pins 26 of the base plate 25 are inserted into the bushings 28 of the insert 2, and the locking springs 29 are hooked by the fastening grooves 26a, thereby securely fixing the base plate 25.

Since the conventional airbag module assembly structure is fastened by the bushings, the locking springs, and the snap pins, it is possible to reduce the number of parts required for mounting the airbag module, thereby improving assembly performance and reducing manufacturing cost. In addition, since the base plate should be strongly pressed and assembled into the insert, its assembly operation is also difficult.

SUMMARY OF THE INVENTION

An object of the present invention is to provide a driver's airbag module having an improved assembly structure of a mounting plate and a cover member, simplifying an assembly process, and reducing manufacturing cost.

Another object of the present invention is to provide a driver's airbag module having an improved structure of a horn plate, preventing rotation of the horn plate when engaged with a steering wheel, and providing a jointless structure.

Still another object of the present invention is to provide a driver's airbag module that can be easily assembled and prevents separation of a hook when an airbag is deployed.

An aspect of the invention provides a driver's airbag module assembly structure including: an inflator for generating gas by igniting an exploder; an airbag inflated toward a driver by the gas generated by the inflator; a cage covering the inflator; a mounting plate for accommodating the inflator, the airbag, and the cage to be fixed in a cover member disposed at a handle; and a horn plate installed between the mounting plate and a steering wheel, characterized in that the mounting plate has a plurality of fixing clips formed at its outer surface, the cover member has a plurality of coupling holes coupled with the fixing clips, the horn plate is provided with a bracket having an angled tip and a fastening hole, and the steering wheel is provided with a groove having an angled step corresponding to the bracket of the horn plate.

Another aspect of the invention provides a driver's airbag module assembly structure including: an inflator for generating gas by igniting an exploder; an airbag inflated toward a driver by the gas generated by the inflator; a cage covering the inflator; a mounting plate for accommodating the inflator, the airbag, and the cage, and having a coupling projection formed at its outer side; a horn plate installed between the mounting plate and a steering wheel; and a cover member having a coupling hole coupled with the coupling projection to be coupled with the mounting plate, characterized in that the coupling hole of the cover member has a "T" shape formed of a horizontal hole and a vertical hole, the horizontal hole has a projection projecting downward from an upper center thereof to be inserted into the coupling hole, and the horizontal hole has terminating holes extending downward from both ends thereof to thereby form flexible pieces at both upper parts of the vertical hole.

Still another aspect of the invention provides a driver's airbag module assembly structure including: an inflator for generating gas by igniting an exploder; an airbag inflated toward a driver by the gas generated by the inflator; a cage covering the inflator; a mounting plate for accommodating the inflator, the airbag, and the cage, and having a coupling projection formed at its outer side; a horn plate installed between the mounting plate and a steering wheel; and a cover member having a coupling hole coupled with the coupling projection to be coupled with the mounting plate, characterized in that the coupling projection comprises a rib projecting from the mounting plate, and an "L"-shaped fastening plate having a horizontal part and a vertical part which are bent to form a right angle to be supported by the rib, a guide piece bent outward from a tip of the vertical part, and a step formed at a lower end of the vertical part.

Yet another aspect of the invention provides a driver's airbag module assembly structure including: an inflator for generating gas by igniting an exploder; an airbag inflated toward a driver by the gas generated by the inflator; a cage covering the inflator; a mounting plate for accommodating the inflator, the airbag, and the cage, and having a coupling projection formed at its outer side; a horn plate installed between the mounting plate and a steering wheel; and a cover member having a coupling hole coupled with the coupling projection to be coupled with the mounting plate, characterized in that the coupling projection includes a rib projecting from the mounting plate, and an "L"-shaped fastening plate having a horizontal part and a vertical part which are bent to form a right angle to be supported by the rib, the coupling projection having a guide projection bent outward from a tip of the vertical part, and the fastening plate having a step formed at a lower end of the vertical part.

Yet another aspect of the invention provides a driver's airbag module assembly structure comprising an airbag installed between a cover member and a mounting plate, characterized in that the cover member has an extension hole extending from both ends of a lower horizontal hole in a sloped manner, a vertical hole is vertically formed at a center of the lower horizontal hole, and a coupling hole is integrally formed with an upper horizontal hole at an upper end of the vertical hole.

Yet another aspect of the invention provides a driver's airbag module assembly structure comprising an airbag installed between a cover member and a mounting plate, characterized in that the cover member has an upper horizontal hole and a lower horizontal hole formed at upper and lower parts thereof, respectively, inclined extension holes are formed at both ends of the upper and lower horizontal holes, and a vertical hole is integrally formed between the upper and lower horizontal holes.

BRIEF DESCRIPTION OF THE DRAWINGS

The above and other objects, features and advantages of the present invention will become more apparent from the following detailed description taken in conjunction with the accompanying drawings, in which.

DETAILED DESCRIPTION OF EXEMPLARY EMBODIMENTS

Hereinafter, a first exemplary embodiment of the present invention will be described with reference to FIGS. 2 and 3.

Figure 1A:
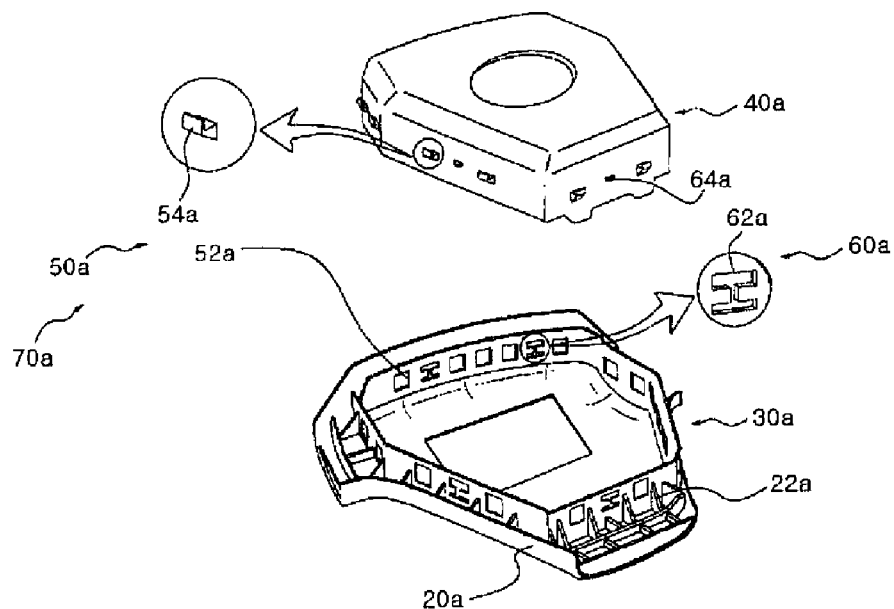
FIG. 1A is an exploded perspective view of a conventional airbag module.
Figure 1B:
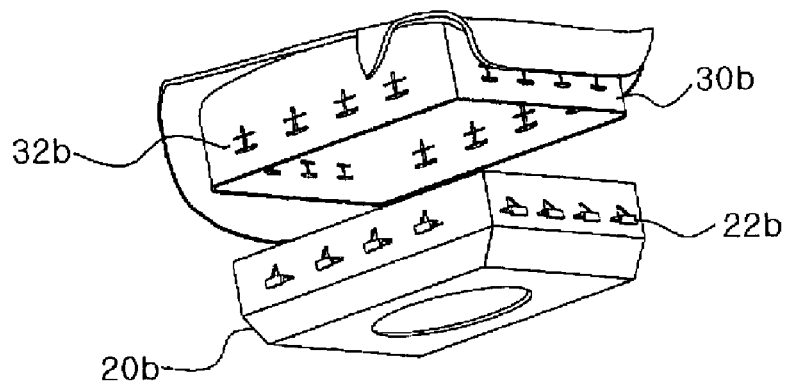
FIG. 1B is an exploded perspective view of a conventional airbag module.
Figure 1C:
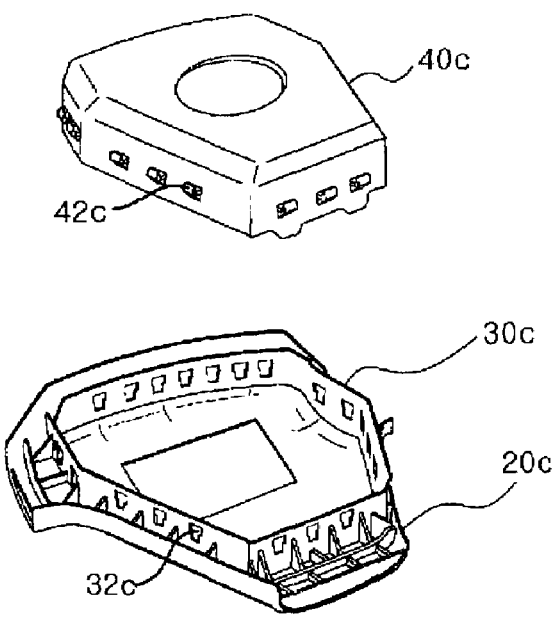
FIG. 1C is an exploded perspective view of a conventional airbag module.
Figure 1D:
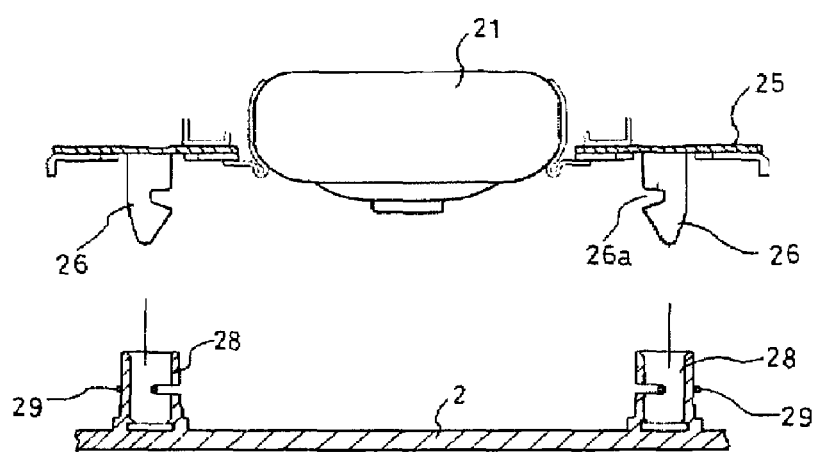
FIG. 1D is a cross-sectional view of a conventional airbag module.
Figure 2:
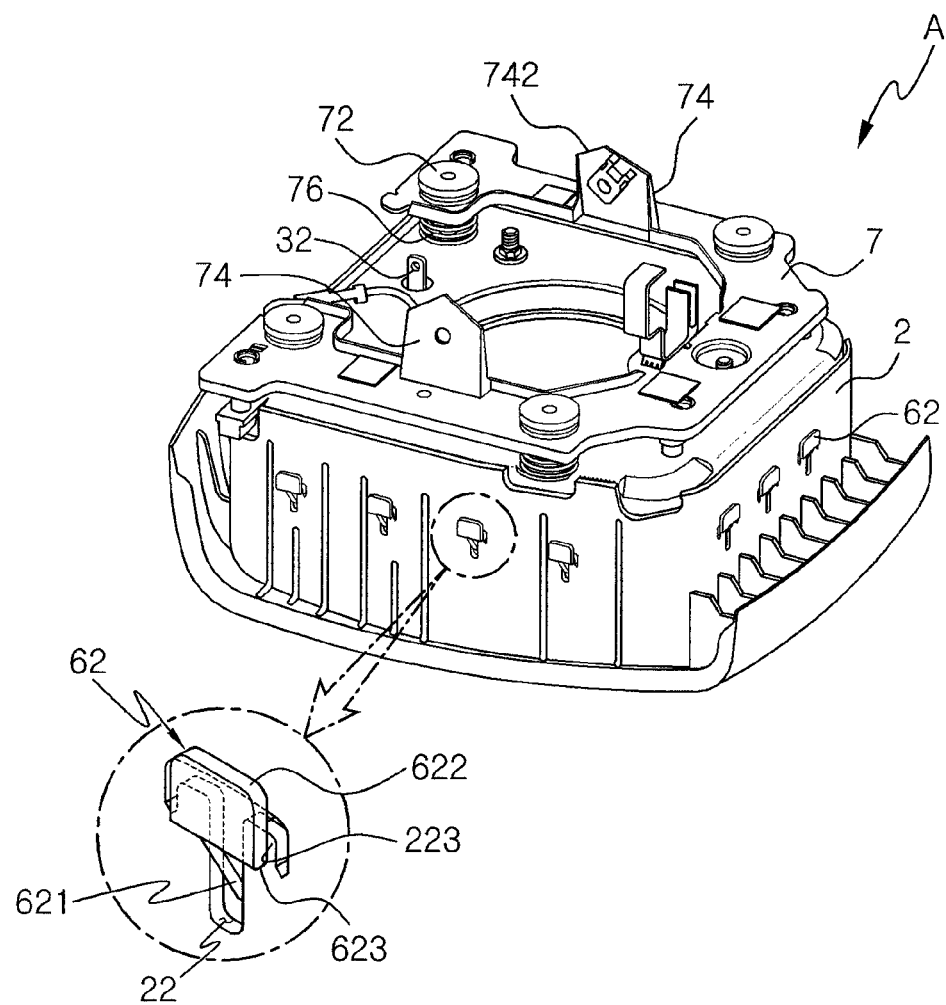
FIG. 2 is a perspective view of a driver's airbag module in accordance with a first exemplary embodiment of the present invention.
Figure 3:
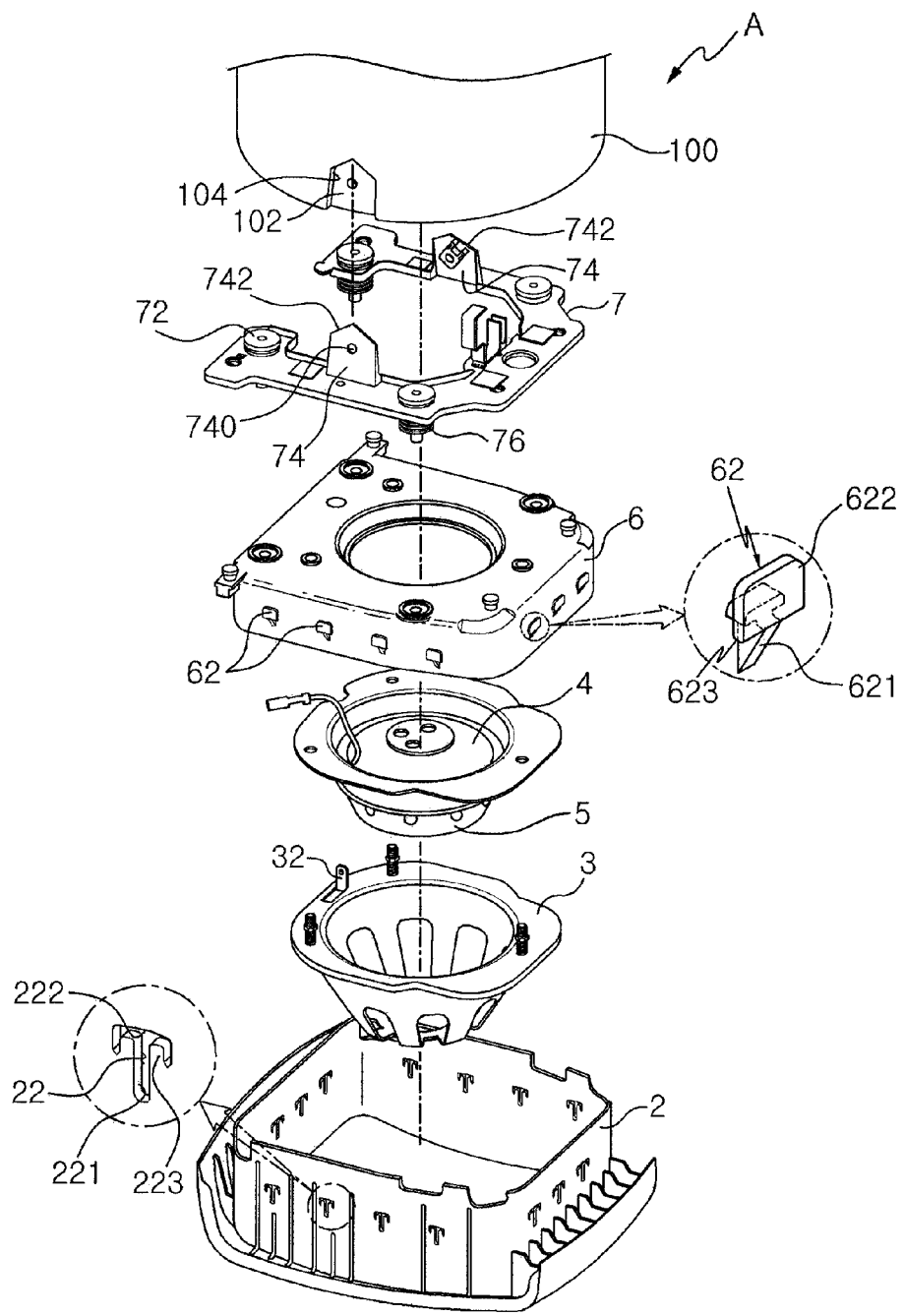
FIG. 3 is an exploded perspective view of FIG. 2.

As shown in FIGS. 2 and 3, a driver's airbag module A in accordance with the present invention includes an inflator 4 for generating gas by igniting an exploder, an airbag 5 expanded and deployed toward a driver by the gas generated by the inflator 4, a cage 3 covering the inflator 4, a mounting plate 6 for accommodating the inflator 4, the airbag 5, and the cage 3, and fixed in a cover member 2 provided at a handle, and a horn plate 7 installed on the mounting plate 6 and coupled with a steering wheel 100.

The horn plate 7 and the mounting plate 6 are fixed to each other by a mounting bolt 72 in a spaced-apart state, and a horn spring 76 is interposed at an outer periphery of the mounting bolt 72 to resiliently support the horn plate 7.

In addition, a plurality of fixing clips 62 are formed at an outer surface of the mounting plate 6, and a plurality of coupling holes 22, through which the fixing clips are coupled, are formed at the cover member 2.

Further, the fixing clip 62 has an approximately "T" shape. The fixing clip 62 includes a vertical part 621 formed of a metal piece, a lower end of which is fixed to the mounting plate 6 and bifurcated to both sides to provide resilient force.

A horizontal rib 622 is integrally formed with an upper end of the fixing clip 62. In addition, the rib 622 has a predetermined step 623 to prevent separation of the cover member 2 when the rib 622 is inserted into the coupling hole 22.

Further, the cover member 2 has a "T"-shaped coupling hole 22 formed of a vertical hole 221 and a horizontal hole 222, corresponding to the fixing clip 62. Both ends of the horizontal hole 222 extend downward to form flanges 223 at both upper ends of the vertical hole 221, respectively.

In addition, the cover member 2 is formed of plastic material to provide a small resilient force to the flanges 223, and the fixing clips 62 of the mounting plate 6 are inserted into the horizontal holes 222 of the coupling holes 22. Here, the flanges 223 are bent outward, returned to their original position, and inserted into a rear side of the ribs 622 to be hooked by the steps 623, thereby securely fixing the fixing clips 62.

Further, the horn plate 7 includes predetermined brackets 74 opposite to each other and fixed to the steering wheel 100 using bolts.

In addition, the steering wheel 100 has grooves 102, into which the brackets 674 are inserted, respectively.

Here, the bracket 74 has a "⌒" shape at its tip 742, and predetermined fastening holes 740 formed at one side and through which bolts (not shown) are fastened.

In addition, the steering wheel 100 has the grooves 102, and the grooves 102 have "⌒"-shaped steps 104 corresponding to the brackets 74 of the horn plate 7.

Therefore, when the brackets 74 are inserted into the grooves 102, since the tips 742 are closely adhered to the steps 104, it is possible to prevent rotation of the horn plate 7 when the bolts are fastened, thereby securely fastening the horn plate 7 at a precise position.

Further, the cage 3 has a terminal projection 32 cut from one side of the cage 3 and bent upward to be directly coupled with a horn contact (not shown), thereby simplifying its constitution by not requiring a separate connection element.

Hereinafter, assembly and operation of the present invention will be described in detail.

In the airbag module assembly structure in accordance with the first exemplary embodiment of the present invention, a cage 3 and an inflator 4 are accommodated in a mounting plate 6. Then, the mounting plate 6 is inserted into a cover member 2, and fixing clips 62 are coupled with coupling holes 22. In addition, a horn plate 7 is coupled with the mounting plate 6 to complete assembly of a driver's airbag module A.

That is, when the fixing clips 62 of the mounting plate 6 are inserted into the coupling holes 22 of the cover member 2, resilient flanges 223 of the cover member 2 are bent to allow ribs 622 of the fixing clips 62 to be inserted into horizontal holes 622 of the coupling holes 22, and at the same time, the flanges 223 return to their original positions to be positioned behind the ribs 622, thereby securely coupling the fixing clips 62 to the coupling holes 22.

In addition, brackets 74 of the horn plate 7 are inserted into grooves 102 of a steering wheel 100, and bolts are fastened thereto, thereby fixing the driver's airbag module A to the steering wheel 100. Here, tips 742 of the brackets 74 are closely adhered to steps 104 of the grooves 102 to prevent rotation of the horn plate 7 when bolts are fastened, thereby securely fixing the brackets 74. Therefore, it is possible to solve the problem of noise due to movement of the horn plate 7.

Hereinafter, second to seventh exemplary embodiments of the present invention will be described with reference to FIGS. 4 to 11.

As shown in FIGS. 4 to 11, a driver's airbag module A in accordance with second to seventh exemplary embodiments A1 to A6 of the present invention includes an inflator 4 for generating gas by igniting an exploder, an airbag 5 inflated and deployed toward a driver by the gas generated by the inflator 4, a cage 3 covering the inflator 4, a mounting plate 6 for accommodating the inflator 4, the airbag 5, and the cage 3, and fixed in the cover member 2 provided on a handle; and a horn plate 7 installed on the mounting plate 6 and coupled with the steering wheel 100.

In addition, the horn plate 7 and the mounting plate 6 are fixed to each other by a mounting bolt 72 in a spaced-apart state, and a horn spring 76 is interposed onto an outer periphery of the mounting bolt 72, thereby resiliently supporting the horn plate 7 and the mounting plate 6.

Further, a plurality of coupling projections 62 are formed at an outer surface of the mounting plate 6, and a plurality of coupling holes 22 coupling with the coupling projections 62 are formed at the cover member 2.

Hereinafter, second to seventh exemplary embodiments A1 to A5 of coupling holes adapted to the driver's airbag module A of the present invention will be described.

Figure 4:
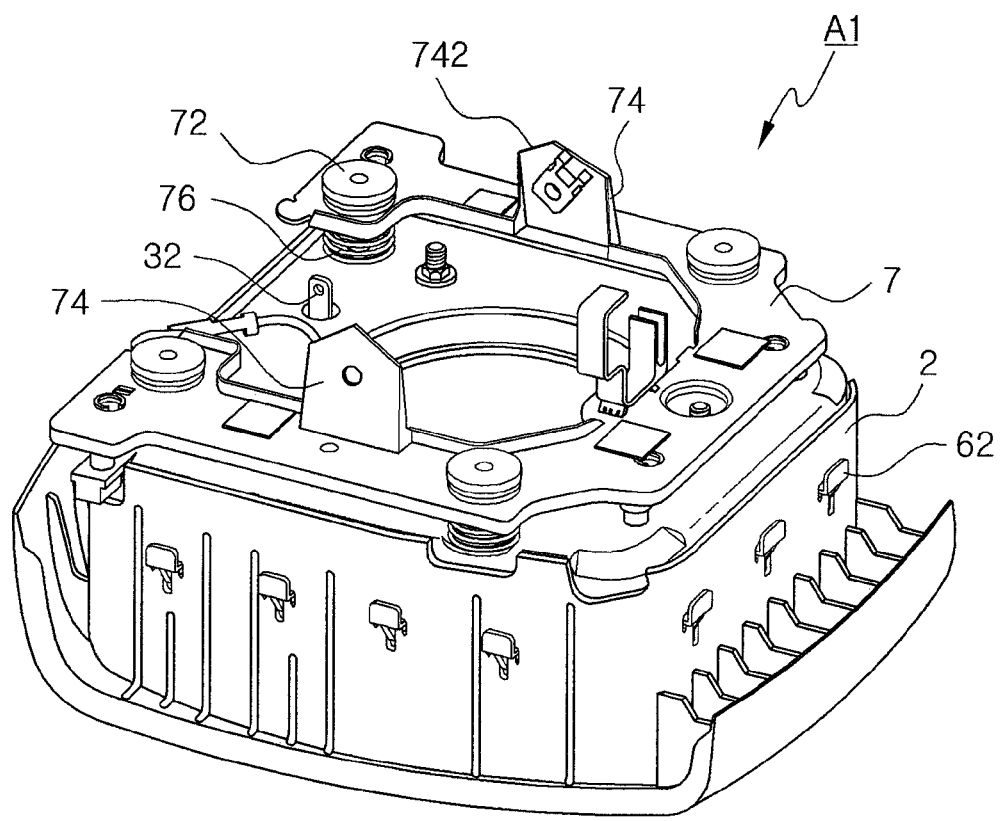
FIG. 4 is a perspective view of a driver's airbag module in accordance with a second exemplary embodiment of the present invention.
Figure 5:
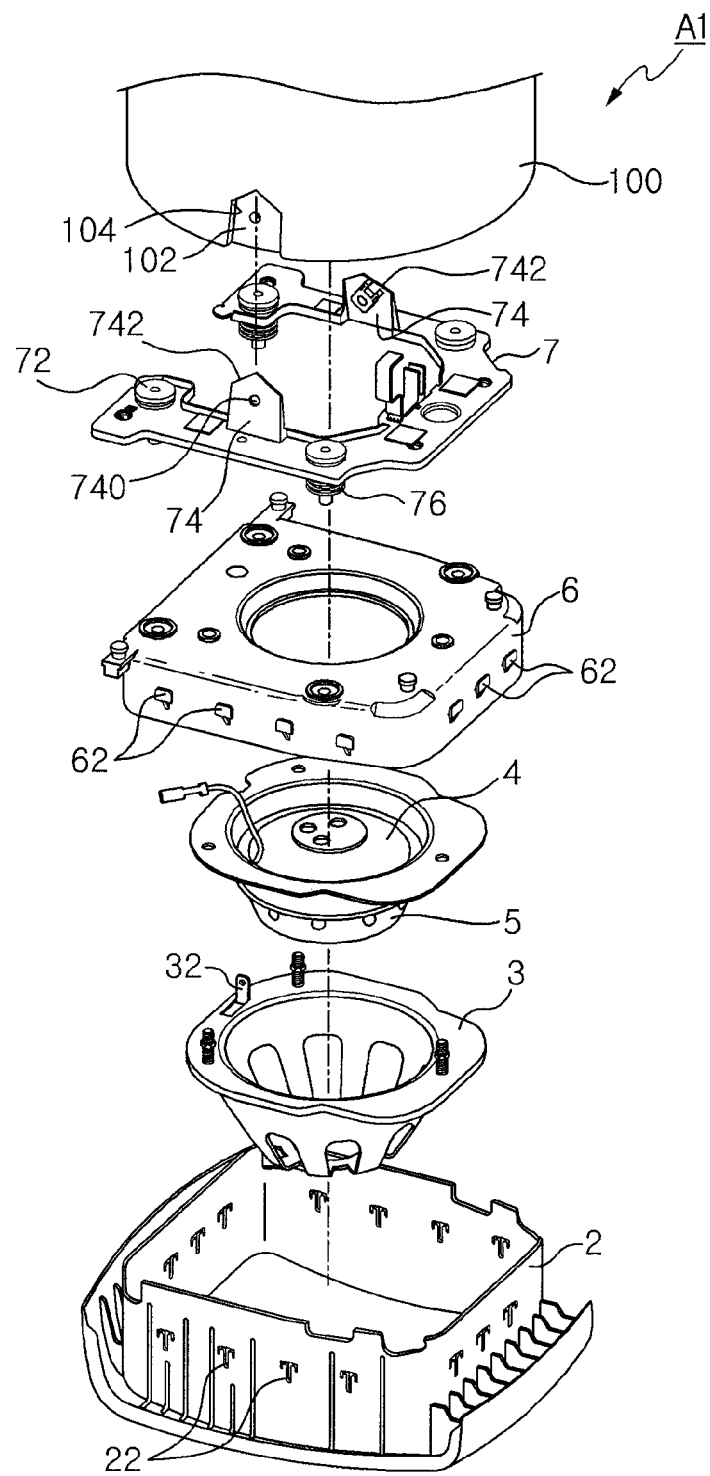
FIG. 5 is an exploded perspective view of the driver's airbag module of FIG. 4.
Figure 6:
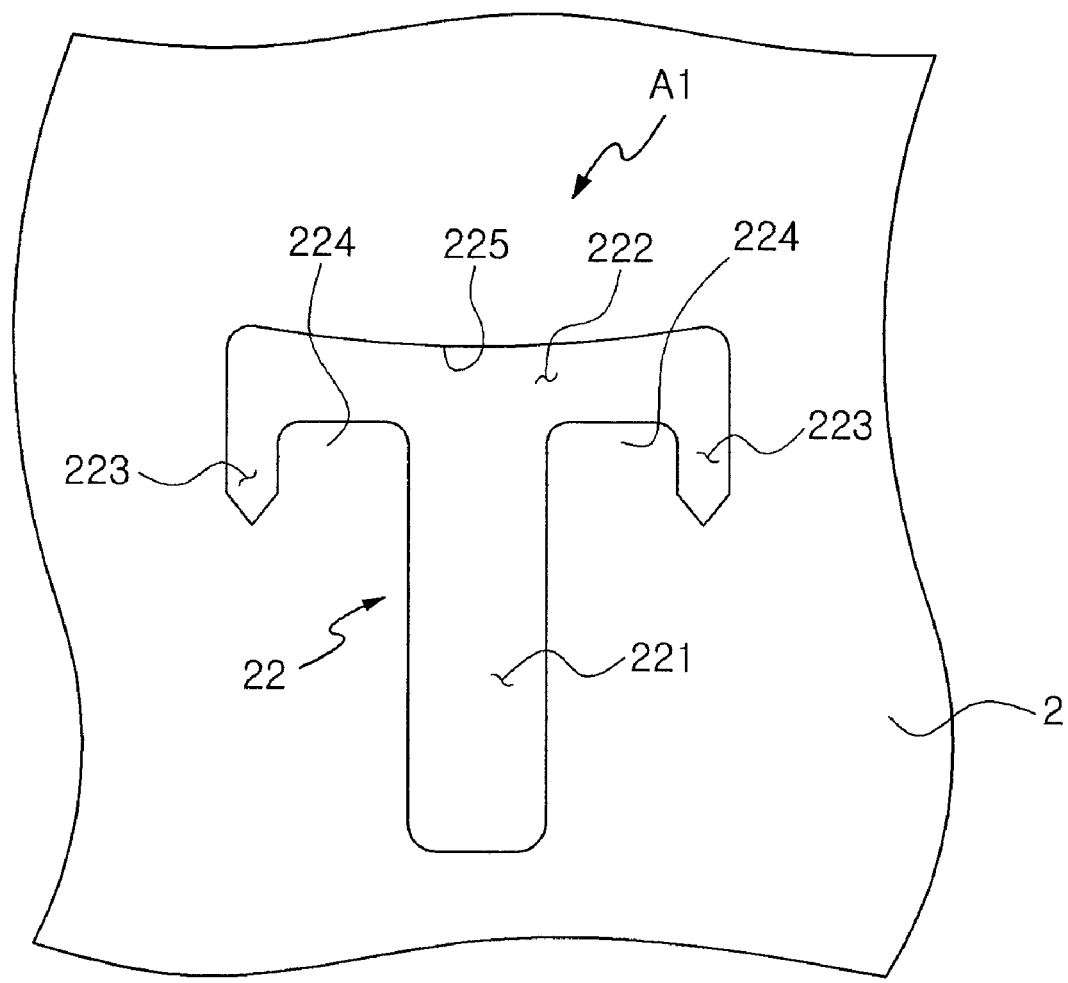
FIG. 6 is a front view of a coupling hole in accordance with a third exemplary embodiment of the present invention.

In the second exemplary embodiment A1 of the present invention shown in FIGS. 4 to 6, a description of components that are the same as in the first exemplary embodiment will be not repeated. Each of coupling holes 22 of a cover member 2 has a "T" shape formed of a horizontal hole 222 and a vertical hole 221, a curved part 225 projects inward from an upper surface of the horizontal hole 222 such that an intermediate part of the horizontal hole 222 has a small width, and both ends thereof have a large width. Terminating holes 223 extend downward from both ends of the horizontal hole 222 to form flexible pieces 224 in contact with an upper part of the vertical hole 221.

That is, the coupling hole 22 includes a predetermined length of horizontal hole 222 formed at a side surface of the cover member 2, and a predetermined length of vertical hole 221 extending downward from a center of the horizontal hole 222, thereby forming an approximately "T" shape.

In addition, the terminating holes 223 extend downward from both ends of the horizontal hole 222.

Therefore, the flexible pieces 224 are formed at both upper sides of the vertical hole 221. When the coupling projections 62 are inserted into the coupling holes 22 of the cover member 2, the flexible pieces 224 are pushed out by resilient force thereof to readily obtain a space to facilitate insertion of the coupling projections 62.

In addition, after the coupling projections 62 are coupled with the coupling holes 22, the flexible pieces 224 are resiliently returned to their positions to support inner surfaces of the coupling projections 62, thereby maintaining the coupled state.

Figure 7:
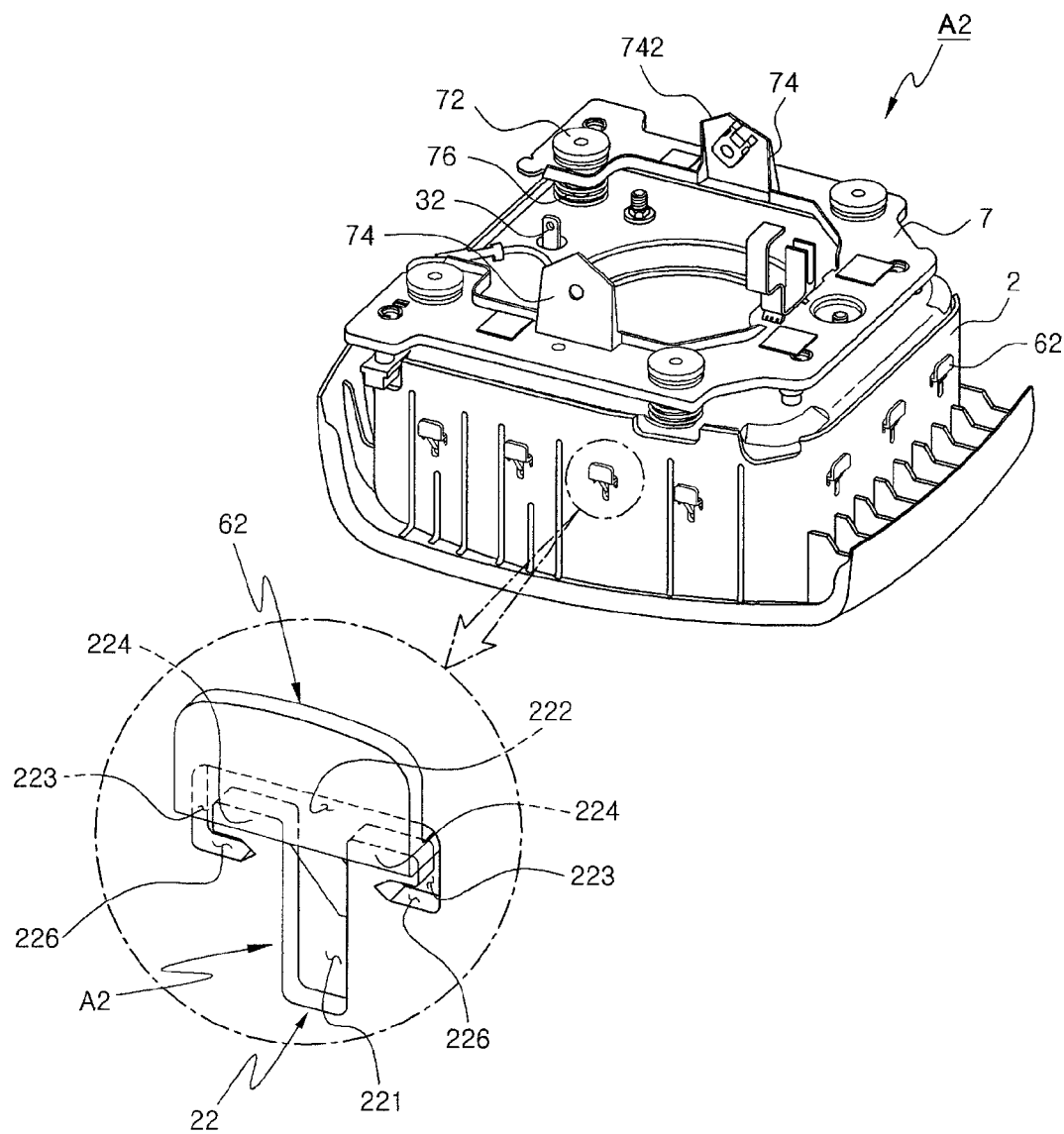
FIG. 7 is a perspective view of a coupling hole in accordance with a fourth exemplary embodiment of the present invention.

FIG. 7 is an enlarged perspective view of a coupling hole of a driver's airbag module assembly structure in accordance with a third exemplary embodiment of the present invention.

In the third exemplary embodiment A2 of the present invention shown in FIG. 7, a description of components that are the same as in the second exemplary embodiment will be not repeated. Each of coupling holes 22 of a cover member 2 has a "T" shape formed of a horizontal hole 222 and a vertical hole 221. Terminating holes 223 extend downward from both ends of the horizontal hole 222. Connection holes 226 extend from inner surfaces of the terminating holes 223 toward the vertical hole 221 to form flexible pieces 224 at both upper sides of the vertical hole 221.

In addition, the coupling hole 22 is formed in the same manner as in the second exemplary embodiment, and includes a predetermined length of horizontal hole 222 formed at a side surface of the cover member 2, and a predetermined length of vertical hole 221 extending downward from a center of the horizontal hole 222, thereby forming an approximately "T" shape.

In addition, the terminating holes 223 extend downward from both ends of the horizontal hole 222.

Specifically, the connection holes 226 extend from inner surfaces of the terminating holes 223 toward the vertical hole 221 to form flexible pieces 224 at both upper sides of the vertical hole 221, thereby increasing resilient force of the flexible pieces 224.

Therefore, the flexible pieces can be more resiliently bent, and the coupling projections 62 can be more readily inserted into the coupling holes 22.

Figure 8:
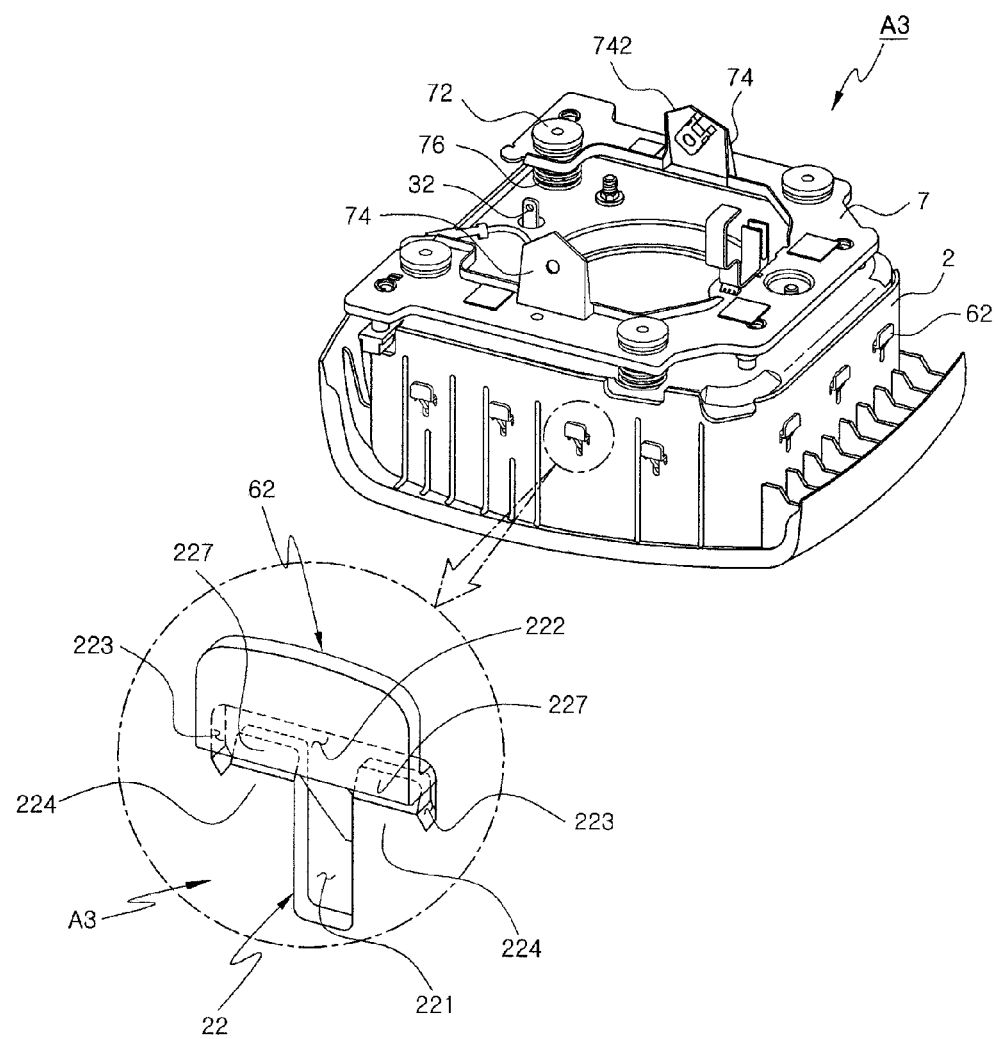
FIG. 8 is a perspective view of a coupling hole in accordance with a fifth exemplary embodiment of the present invention.

FIG. 8 is an enlarged perspective view of a coupling hole of a driver's airbag module assembly structure in accordance with a fourth exemplary embodiment of the present invention.

In the fourth exemplary embodiment A3 of the present invention shown in FIG. 8, a description of components that are the same as in the third exemplary embodiment will be not repeated. Each of coupling holes 22 of a cover member 2 has a "T" shape formed of a horizontal hole 222 and a vertical hole 221. Terminating holes 223 further extend downward from both ends of the horizontal hole 222. Flexible pieces 224 are formed at both sides of the vertical hole 221, and have slopes 227 formed by cutting corners of upper sides thereof.

Therefore, when the coupling projections 62 are inserted into the coupling holes 22, the flexible pieces 224 are guided by the slopes 227 to allow the flexible pieces 224 to be more readily bent, thereby reducing force required to fasten them and readily coupling them.

In addition, the flexible pieces 224 have the slopes at their corners making them thinner, thereby improving resilience of the flexible pieces and reducing probability of damage.

Figure 9:
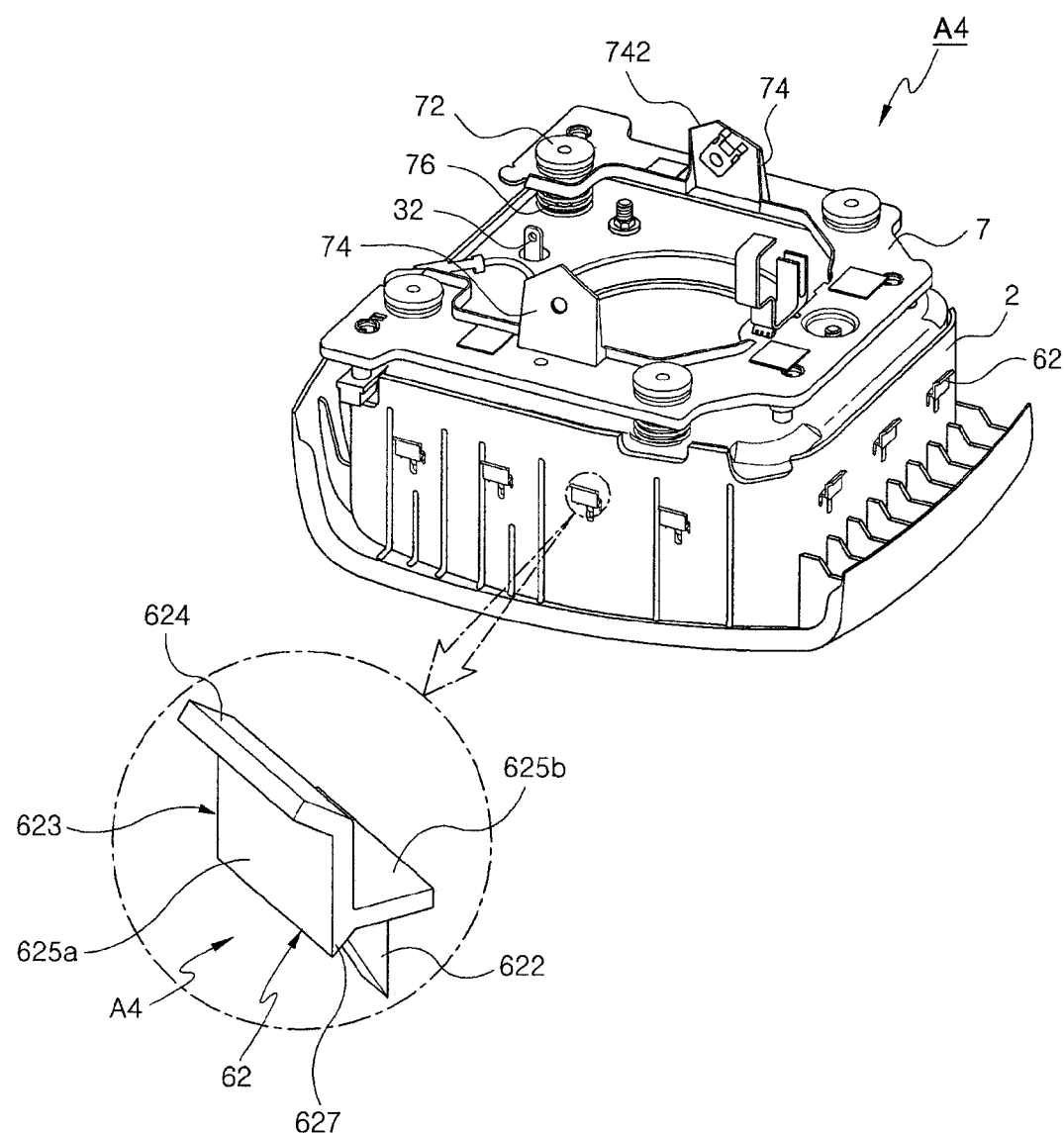
FIG. 9 is a perspective view of a coupling hole in accordance with a sixth exemplary embodiment of the present invention.

FIG. 9 is an enlarged perspective view of a coupling hole of a driver's airbag module assembly structure in accordance with a fifth exemplary embodiment of the present invention.

In the fifth exemplary embodiment A4 of the present invention shown in FIG. 9, a description of components that are the same as in the fourth exemplary embodiment will be not repeated. Each of coupling projections 62 of a mounting plate 6 has a rib 622 projecting from a side surface of a mounting plate 6, and an "L"-shaped fastening plate 623 supported by the rib 622, and having a horizontal part 625b and a vertical part 625a bent to form a right angle. In addition, a guide plate 624 is bent outward from a tip of the vertical part 625a of the fastening plate 623.

Further, the rib 622 has a right triangle shape projecting from a side surface of the mounting plate 6, and the fastening plate 623 is integrally formed with a horizontal surface of the rib 622.

That is, the horizontal part 625b of the fastening plate 623 is adhered to the horizontal surface of the rib 622 so that the vertical part 625a of the fastening part 623 is vertically disposed in parallel with a side surface of the mounting plate 6.

In addition, a tip of the vertical part 625a of the fastening plate 623 is bent outward to form a predetermined guide piece 624. The guide piece 624 is inclined outward from the vertical part 625a by about 20°-30°.

Therefore, since the guide piece 624 of the fastening plate 623 projects more than the mounting plate 6 when the mounting plate 6 is inserted into the cover member 2, though a strong tensile force is applied at the instant that the cover member 2 is pulled during expansion of an airbag 5, it is possible to maintain a more secure coupling state of the mounting plate 6.

In addition, a predetermined step 627 projects from a lower end of the vertical part 625a of the fastening plate 623.

Further, the rib 622 is installed at a lower center of the horizontal part 625b of the fastening plate 623. At this time, the rib 622 should have a thickness substantially smaller than the width of the fastening plate 623.

Especially, since the rib 622 should be inserted into the vertical hole 221 of the coupling hole 22, the rib 622 may have a thickness smaller than the width of the vertical hole 221 of the coupling hole 22.

Figure 10:
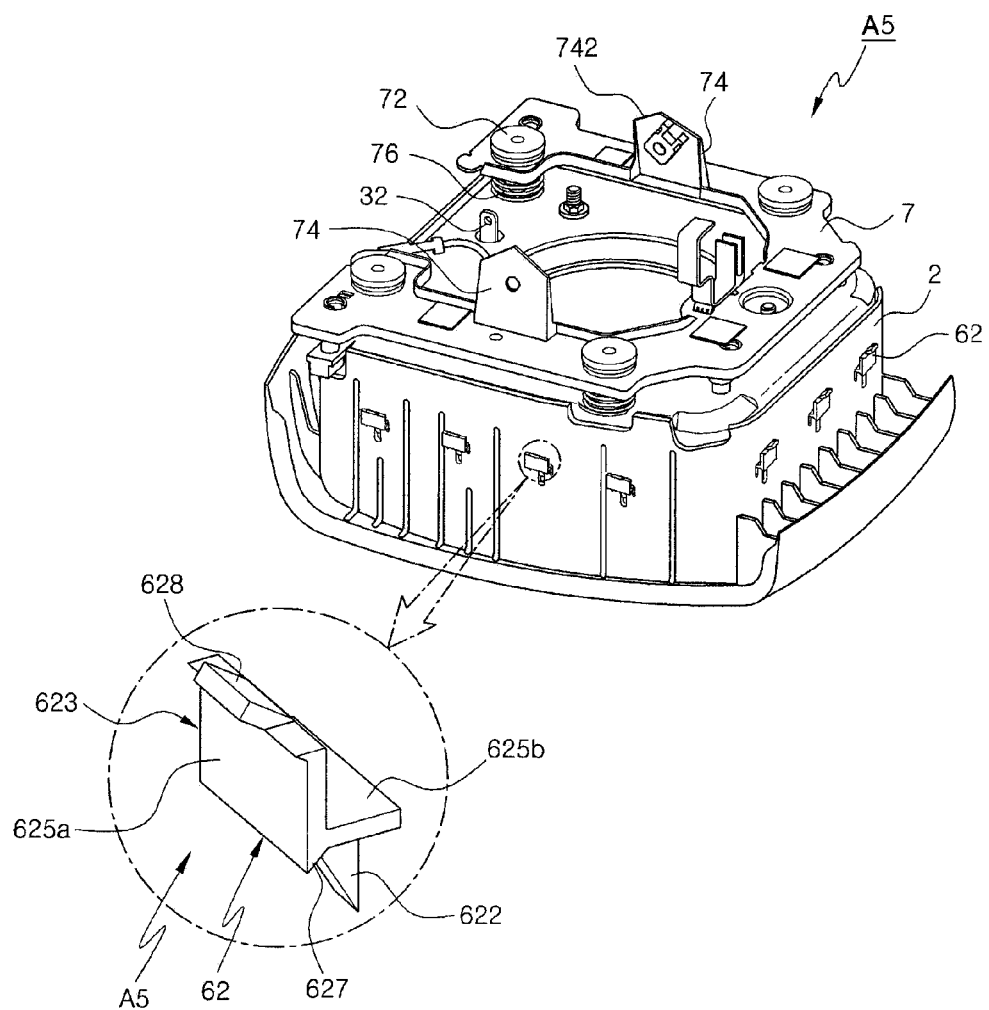
FIG. 10 is a perspective view of a coupling hole in accordance with a seventh exemplary embodiment of the present invention.

FIG. 10 is an enlarged perspective view of a coupling hole of a driver's airbag module assembly structure in accordance with a sixth exemplary embodiment of the present invention.

In the sixth exemplary embodiment A5 of the present invention shown in FIG. 10, a description of components that are the same as in the fifth exemplary embodiment will be not repeated. Each of coupling projections of a mounting plate 6 includes a rib 622 projecting from the mounting plate 6, and an "L"-shaped fastening plate 623 supported by the rib 622 and having a horizontal part 625b and a vertical part 625a bent to form a right angle. In addition, a guide projection 628 is bent outward from a tip of the vertical part 625a of the coupling projection 62.

In addition, the guide projection 628 is bent outward from a tip of the vertical part 625a of the fastening plate 623 in an inclined manner. The guide projection 628 has a width substantially narrower than that of the fastening plate 623.

That is, the guide projection 628 functions as a hooking means for preventing separation of the fastening plate 623 of the coupling projection 62 from the coupling hole 22, similar to the guide piece 624 of the fifth exemplary embodiment A4.

In addition, similar to the fifth exemplary embodiment A4, a predetermined step 627 projects from a lower end of the vertical part 625a of the fastening plate 623.

Figure 11A:
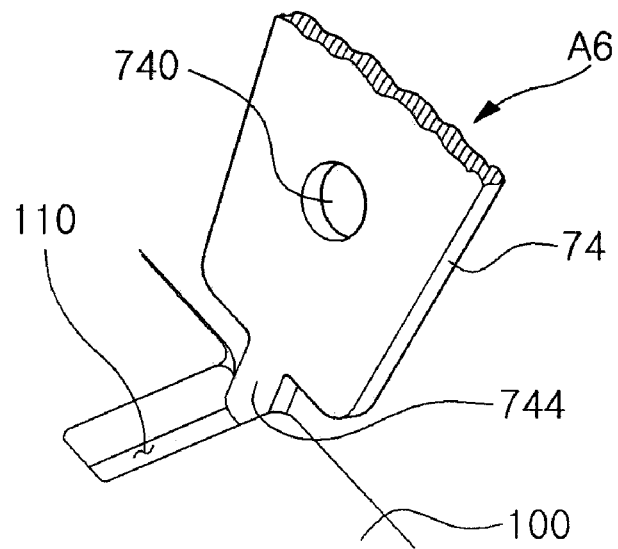
FIGS. 11A and 11B are views of structures of a horn plate and a steering wheel in accordance with a seventh exemplary embodiment of the present invention.
Figure 11B:
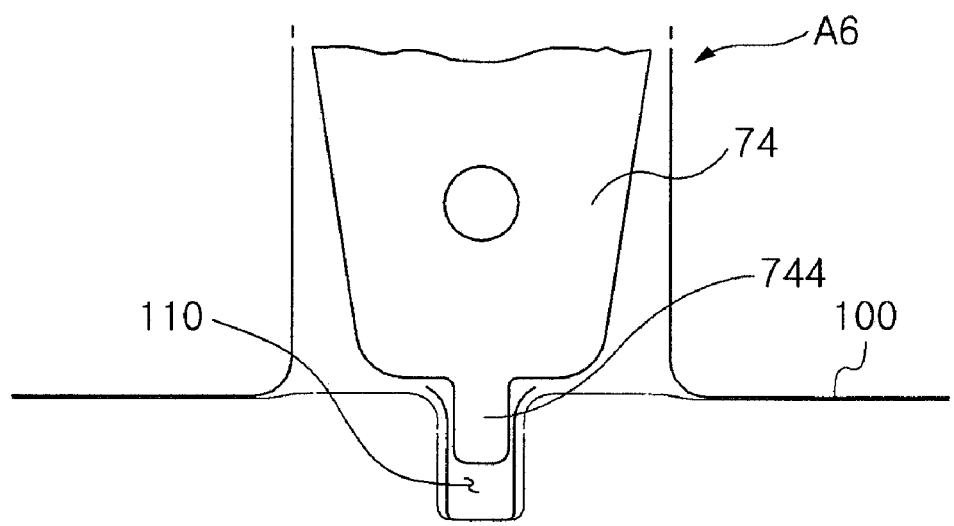

As shown in FIGS. 11A, and 11B, a seventh exemplary embodiment of the present invention provides an improved coupling structure of a horn plate and a steering wheel.

Referring to FIGS. 3 to 10, in the seventh exemplary embodiment A6 of the present invention, a description of components that are the same as in the sixth exemplary embodiment will be not repeated. A horn plate 7 has brackets 74, each of which has a tip 742 projecting upward therefrom, and a predetermined fastening hole 740 formed at one side thereof. A steering wheel 100 has a groove 102 into which the bracket 74 of the horn plate 7 is inserted.

More specifically, the horn plate 7 has the brackets 74 opposite to each other to be fixed to the steering wheel 100 by fastening bolts.

In addition, the tip 742 of the bracket 74 has a """ shape, and the predetermined fastening hole 740, through which a bolt (not shown) is fastened, is formed at one side thereof.

Further, the steering wheel 100 has the groove 102 into which the bracket 74 is inserted. The groove 102 has a """-shaped step corresponding to the bracket 74.

Therefore, when the bracket 74 is inserted into the groove 102, the tip 742 of the bracket 74 is closely adhered to the step 104 of the groove 102 to prevent rotation of the horn plate 7 when the bolt is fastened, thereby securely fastening the bracket 74 in a precise position.

In addition, a cage 3 covering an inflator 4 has a terminal projection 32 cut from one side thereof and bent upward to be directly coupled to a horn (not shown), thereby simplifying the structure of the cage 3 and the inflator 4 by not requiring a separate connection element.

Meanwhile, FIGS. 11A and 11B illustrate another exemplary embodiment of an assembly structure of a horn plate and a steering wheel in accordance with the present invention. FIG. 11A is a perspective view, and FIG. 11B is a front view.

Referring to FIGS. 11A and 11B, the bracket 74 of the horn plate 7 has a predetermined projection 744 formed at its tip, and the steering wheel 100 has an insertion groove 110 into which the projection 744 is inserted.

Therefore, when the horn plate 7 is coupled with the steering wheel 100, the projection 744 is inserted into the insertion groove 110, and a bolt (not shown) is fastened through the fastening hole 740, thereby fixing the horn plate 7 to prevent its rotation.

Assembly and operation of the above exemplary embodiment in accordance with present invention will be described in detail.

As described above, the cage 3 and the inflator 4 are accommodated in the mounting plate 6, the mounting plate 6 is inserted inside the cover member 2, the coupling projections 62 are inserted into the coupling holes 22, and the horn plate 7 is coupled with the mounting plate 6, thereby completing assembly of the driver's airbag module A.

Specifically, when the mounting plate 6 is inserted inside the cover member 2, and the coupling projections 62 arrive at the coupling holes 22, the coupling projections 62 instantly push the flexible pieces of the coupling holes 22 out and are inserted thereinto.

As described above, the ribs 622 of the coupling projections 62 are inserted into the vertical holes 221 of the coupling holes 22, and at the same time, the vertical parts 625a of the fastening plate 621 are inserted into the horizontal holes 222 of the coupling holes 22, thereby coupling the cover member 2 and the mounting plate 6.

Here, the slopes 227 formed at the flexible pieces 227 increase flexibility of the flexible pieces 227 so that the flexible pieces 227 can be rapidly recovered to readily perform coupling between the cover member 2 and the mounting plate 6.

In addition, the brackets 74 of the horn plate 7 are inserted into the grooves 102 of the steering wheel 100, and bolts are fastened thereto, thereby fixing the driver's airbag module A to the steering wheel 100.

Here, the tips 742 of the brackets 74 are closely adhered to the steps 104 of the grooves 102 to prevent rotation of the horn plate 7 when the bolt is fastened, thereby securely fixing the horn plate 7 to prevent noise due to movement of the horn plate 7.

An eighth exemplary embodiment of the present invention will be described with reference to FIGS. 12 to 14.

Figure 12:
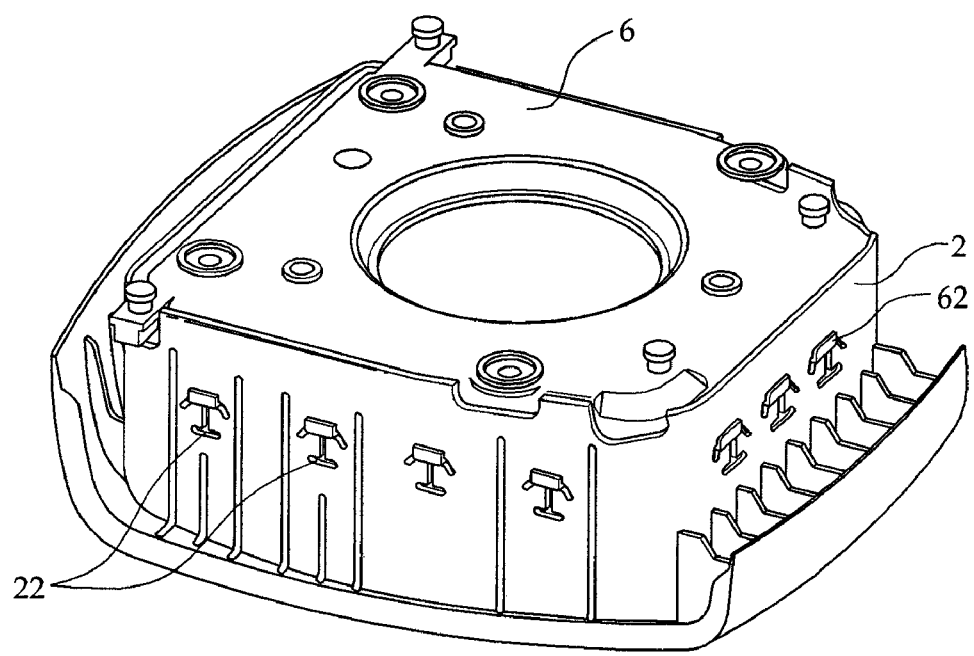
FIG. 12 is a perspective view of an airbag module in accordance with an eighth exemplary embodiment of the present invention.
Figure 13:
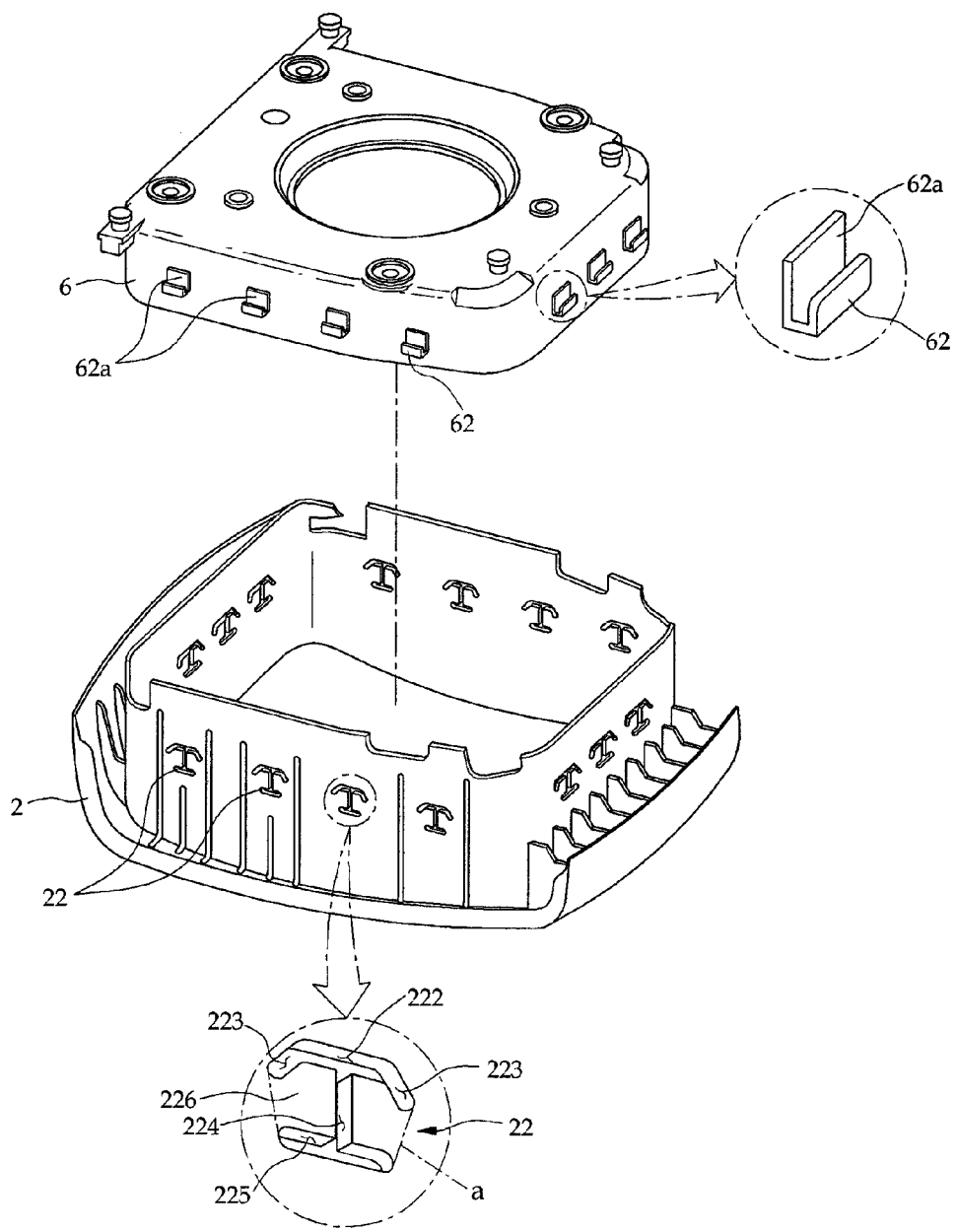
FIG. 13 is an exploded perspective view of an airbag module in accordance with an eighth exemplary embodiment of the present invention.
Figure 14:
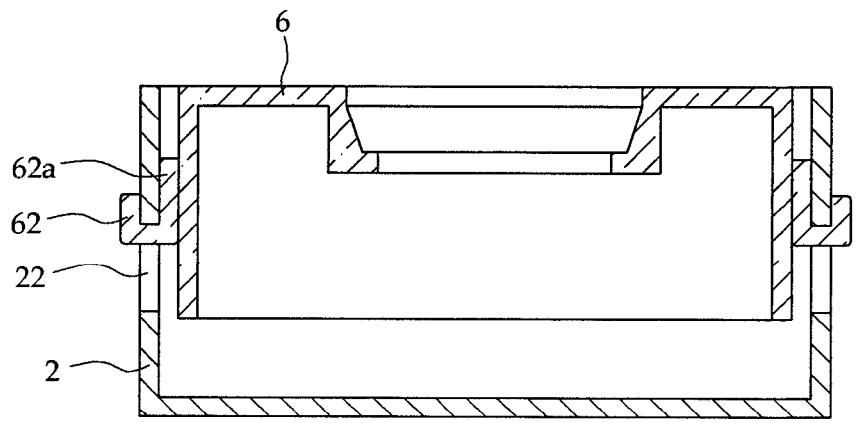
FIG. 14 is a cross-sectional view of the airbag module in accordance with the eighth exemplary embodiment of the present invention.

As shown in FIGS. 12 to 14, in the eighth exemplary embodiment of the present invention, an airbag module includes coupling holes 22 formed at a cover member 2, and coupling projections 62 formed at a mounting plate 6. Of course, the airbag module further includes an inflator 4, an airbag 5, a cage 3, and so on. In addition, each of the coupling holes 22 formed at the cover member 2 has a lower horizontal hole 222, and extension holes 223 extending from both ends of the lower horizontal hole 222 at a symmetrical angle.

Further, the lower horizontal hole 222 has a vertical hole 224 formed at its center, and an upper horizontal hole 225 horizontally formed at an upper end of the vertical hole 224. The lower horizontal hole 222, the extension holes 223, the vertical hole 224, and the upper horizontal hole accommodate flexible pieces 226.

That is, the flexible piece 226 has an approximately pentagonal shape defined by a tip of the extension hole 223 and a tip of the upper horizontal hole 225. The flexible piece 226 has a thickness smaller than the cover member 2 to increase its flexibility.

In addition, the mounting plate 6 has a plurality of ribs 62a projecting from an outer surface of the mounting plate 6, and a plurality of coupling projections 62 bent downward from the ribs 62a.

As described above, the cover member 2 formed of synthetic resin is inserted inside the mounting plate 6 and coupled therewith. That is, the coupling projections 62 projecting from the mounting plate 6 are inserted inside the cover member 2 and pressed thereinto, and push the flexible pieces 226 of the coupling holes 22 out, thereby being inserted into the coupling holes 22.

Since the flexible piece 226 is cut except for the tip of the extension hole 223 and the upper horizontal hole 225, the flexible piece 22 can be readily bent by the coupling projection 62 projecting from the mounting plate 6. That is, the flexible piece 226 is bent sufficiently about a dashed line "a" shown in FIG. 13 to allow the coupling projection 62 to be inserted.

As described above, the airbag module is mounted on the steering wheel (not shown) in a state in which the mounting plate 6 is fixed inside the cover member 2. The airbag module mounted on the steering wheel detects impact due to an automobile collision using an impact sensor to transmit a signal to an electronic control unit. The electronic control unit determines operation of the airbag to deploy the airbag.

The airbag of the airbag module is deployed by expansion gas generated by the inflator to enlarge the cover member 2 and the mounting plate 6 outward. Enlargement of the cover member 2 and the mounting plate 6 and inflation of the airbag applies action and reaction to the cover member 2 and the mounting plate 6 using external force.

As a result, though the coupling projection 62 pushes the flexible pieces 226 according to action and reaction, the flexible pieces 226 are moved together with the coupling projection 62. At this time, external force applied to the flexible pieces 226 is applied along a sloping dashed line "a" to be distributed such that the flexible pieces 226 are moved to prevent separation of the coupling projection 62.

Figure 15:
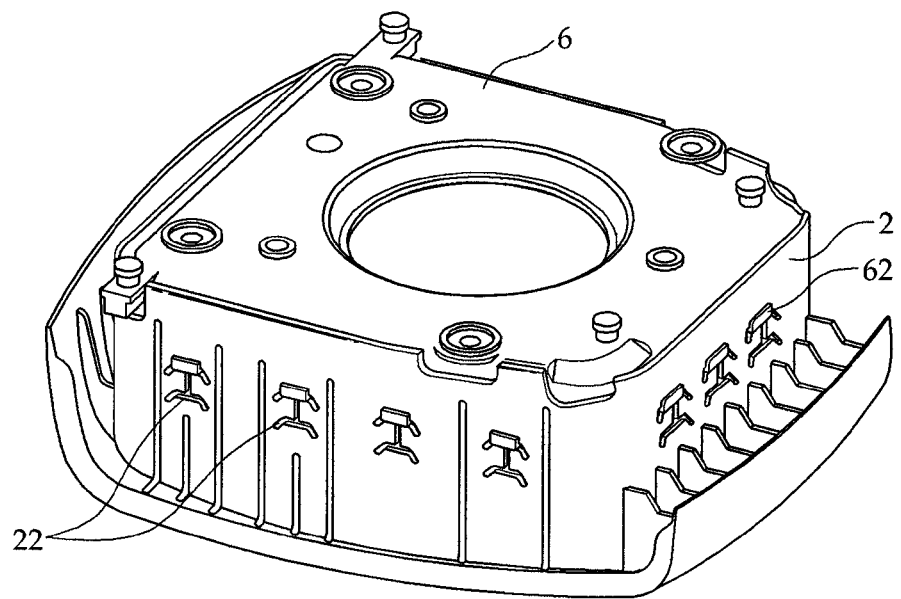
FIG. 15 is a perspective view of an airbag module in accordance with a ninth exemplary embodiment of the present invention.
Figure 16:
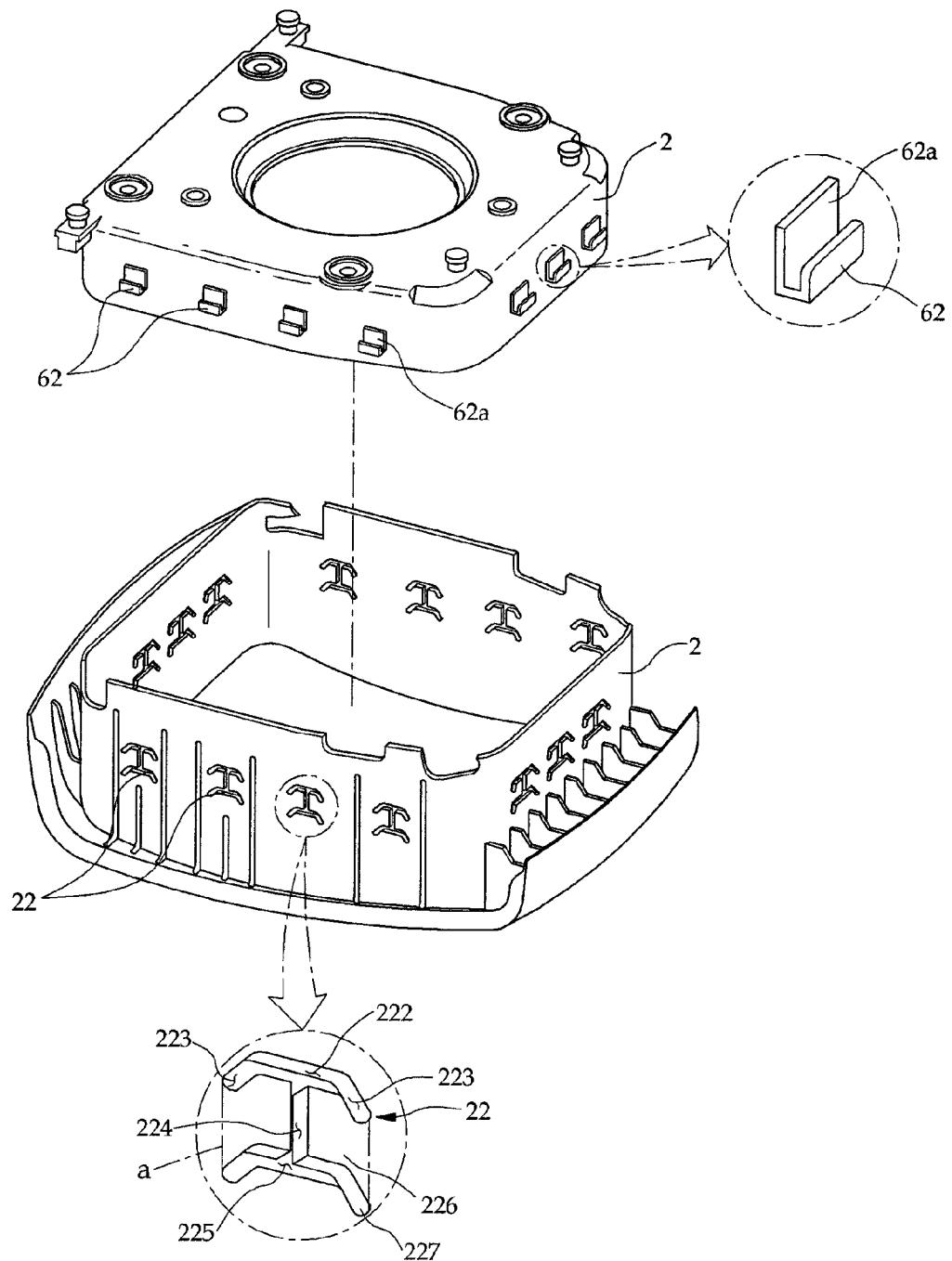
FIG. 16 is an exploded perspective view of the airbag module in accordance with the ninth exemplary embodiment of the present invention.

In addition, as shown in FIGS. 15 and 16, though a ninth exemplary embodiment of the present invention is similar to the eighth exemplary embodiment, extension holes 227 extend from both ends of the upper horizontal hole 225, similar to the lower horizontal hole 222.

As described above, the ninth exemplary embodiment of the present invention is similar to the eighth exemplary embodiment, and thus will not be described in detail to avoid unnecessary repetition.

As can be seen from the foregoing, it is possible to improve the assembly structure of a mounting plate and a cover member to simplify an assembly process and reduce manufacturing cost. In addition, it is possible to prevent rotation of a horn plate when a driver's airbag module is coupled with a steering wheel to enable secure coupling, thereby providing a jointless structure.

Further, hooks of a mounting plate push flexible pieces formed at coupling holes of a cover member to allow the mounting plate and the cover member to be easily coupled with each other. Furthermore, since the hooks are closely inserted into lower horizontal holes, movement of the hooks can be reduced. In addition, the hooks do not separate from the coupling holes when the airbag is deployed.

While this invention has been described with reference to exemplary embodiments thereof, it will be clear to those of ordinary skill in the art to which the invention pertains that various modifications may be made to the described embodiments without departing from the spirit and scope of the invention as defined in the appended claims and their equivalents.

What is claimed is:

1. A driver's airbag module assembly structure comprising: an inflator for generating gas by igniting an exploder; an airbag inflated toward a driver by the gas generated by the inflator; a cage covering the inflator; a mounting plate for accommodating the inflator, the airbag, and the cage to be fixed in a cover member disposed at a handle; and a horn plate installed between the mounting plate and a steering wheel, characterized in that the mounting plate has a plurality of fixing clips formed at its outer surface, the cover member has a plurality of coupling holes coupled with the fixing clips, the horn plate is provided with a bracket having an angled tip and a fastening hole, and the steering wheel is provided with a groove having an angled step corresponding to the bracket of the horn plate.

2. The driver's airbag module assembly structure according to claim 1, wherein the fixing clip of the mounting plate has a "T" shape, a lower end of a vertical part of the fixing clip is fixed to the mounting plate to be resiliently bent outward, a horizontal rib is formed at an upper end of the vertical part of the fixing clip, and a step is formed at a lower end of the rib.

3. The driver's airbag module assembly structure according to claim 2, wherein the coupling hole of the cover member has a "T" shape formed of a vertical hole and a horizontal hole corresponding to the fixing clip, and both ends of the horizontal hole extend downward to form flanges at both upper sides of the vertical hole.

4. The driver's airbag module assembly structure according to claim 3, wherein the tip of the bracket of the horn plate has a "^" shape, and the step of the groove of the steering wheel has a "^" shape corresponding thereto.

5. The driver's airbag module assembly structure according to claim 4, wherein a portion of the cage is cut and bent vertically to form a terminal projection.

6. The driver's airbag module assembly structure according to claim 3, wherein the tip of the bracket of the horn plate has a predetermined projection, and the groove of the steering wheel has an insertion groove into which the projection is inserted, corresponding thereto.

7. The driver's airbag module assembly structure according to claim 1, wherein the coupling hole of the cover member has a "T" shape formed of a vertical hole and a horizontal hole corresponding to the fixing clip, and both ends of the horizontal hole extend downward to form flanges at both upper sides of the vertical hole.

8. The driver's airbag module assembly structure according to claim 7, wherein the tip of the bracket of the horn plate has a "^" shape, and the step of the groove of the steering wheel has a "^" shape corresponding thereto.

9. The driver's airbag module assembly structure according to claim 8, wherein a portion of the cage is cut and bent vertically to form a terminal projection.

10. The driver's airbag module assembly structure according to claim 7, wherein the tip of the bracket of the horn plate has a predetermined projection, and the groove of the steering wheel has an insertion groove into which the projection is inserted, corresponding thereto.

11. A driver's airbag module assembly structure comprising: an inflator for generating gas by igniting an exploder; an airbag inflated toward a driver by the gas generated by the inflator; a cage covering the inflator; a mounting plate for accommodating the inflator, the airbag, and the cage, and having a coupling projection formed at its outer side; a horn plate installed between the mounting plate and a steering wheel; and a cover member having a coupling hole coupled with the coupling projection to be coupled with the mounting plate, characterized in that the coupling hole of the cover member has a "T" shape formed of a horizontal hole and a vertical hole, the coupling projection horizontal hole has a projection projecting downward from an upper center thereof to be inserted into the vertical hole, and the horizontal hole has terminating holes extending downward from both ends thereof to thereby form flexible pieces at both upper parts of the vertical hole.

* * * * *